(12) United States Patent
Brown et al.

(10) Patent No.: US 8,195,128 B2
(45) Date of Patent: Jun. 5, 2012

(54) SYSTEM AND METHOD FOR PROCESSING ATTACHMENTS TO MESSAGES SENT TO A MOBILE DEVICE

(75) Inventors: Michael Kenneth Brown, Fergus (CA); Michael Grant Kirkup, Waterloo (CA); Michael Stephen Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/089,456

(22) Filed: Apr. 19, 2011

(65) Prior Publication Data
US 2011/0195690 A1   Aug. 11, 2011

Related U.S. Application Data

(63) Continuation of application No. 11/849,433, filed on Sep. 4, 2007, now Pat. No. 7,949,355.

(51) Int. Cl.
*H04M 1/66* (2006.01)
(52) U.S. Cl. .................. 455/411; 455/466; 455/556.2
(58) Field of Classification Search ................ 455/556.2, 455/411, 466
See application file for complete search history.

(56) References Cited

U.S. PATENT DOCUMENTS

| | | |
|---|---|---|
| 4,028,500 A | 6/1977 | McClure et al. |
| 5,410,602 A | 4/1995 | Finkelstein et al. |
| 5,457,748 A | 10/1995 | Bergum et al. |
| 5,647,002 A | 7/1997 | Brunson |
| 5,666,530 A | 9/1997 | Clark et al. |
| 5,754,778 A | 5/1998 | Shoujima |
| 5,771,355 A | 6/1998 | Kuzma |
| 5,812,671 A | 9/1998 | Ross |
| 6,061,448 A | 5/2000 | Smith et al. |
| 6,073,237 A | 6/2000 | Ellison |
| 6,081,601 A | 6/2000 | Raivisto |
| 6,084,969 A | 7/2000 | Wright et al. |
| 6,085,323 A | 7/2000 | Shimizu et al. |

(Continued)

FOREIGN PATENT DOCUMENTS
CA   2639161   3/2009
(Continued)

OTHER PUBLICATIONS

Advisory Action. Co-pending U.S. Appl. No. 11/291,163. Dated: Feb. 1, 2010.

(Continued)

*Primary Examiner* — Kwasi Karikari
(74) *Attorney, Agent, or Firm* — Bereskin & Parr LLP/S.E.N.C.R.L., s.r.l.

(57) ABSTRACT

A system and method for processing attachments to messages sent to a mobile device is described herein. Embodiments described herein apply to encrypted messages comprising multiple message parts, in which different encryption keys (e.g. session keys) have been used to encrypt the different message parts. In at least one example embodiment, the encrypted session keys for every message content part comprising an attachment is received at the mobile device. In one embodiment, all of the encrypted session keys are stored together in a main message header. The mobile device may then decrypt the encrypted session key associated with a user requested attachment, and transmits the decrypted session key to one or more remote servers in an attachment request for use in decrypting the requested attachment. Data associated with the requested attachment, in decrypted form, is returned to the mobile device.

20 Claims, 6 Drawing Sheets

U.S. PATENT DOCUMENTS

| | | | |
|---|---|---|---|
| 6,119,228 A | 9/2000 | Angelo et al. |
| 6,219,694 B1 | 4/2001 | Lazaridis et al. |
| 6,229,894 B1 | 5/2001 | Van Oorschot et al. |
| 6,266,420 B1 | 7/2001 | Langford et al. |
| 6,275,850 B1 | 8/2001 | Beyda et al. |
| 6,289,105 B1 | 9/2001 | Murota |
| 6,356,937 B1 | 3/2002 | Montville et al. |
| 6,397,261 B1 | 5/2002 | Eldridge et al. |
| 6,616,038 B1 | 9/2003 | Olschafskie et al. |
| 6,661,927 B1 | 12/2003 | Suarez et al. |
| 6,684,088 B1 | 1/2004 | Halahmi |
| 6,779,115 B1 | 8/2004 | Naim |
| 6,795,924 B1 | 9/2004 | Kiessling et al. |
| 6,829,357 B1 | 12/2004 | Alrabady et al. |
| 6,865,191 B1 | 3/2005 | Bengtsson et al. |
| 6,868,274 B1 | 3/2005 | Ayabe et al. |
| 6,904,521 B1 | 6/2005 | Jivsov |
| 6,918,038 B1 | 7/2005 | Smith et al. |
| 6,925,568 B1 | 8/2005 | Heinonen |
| 6,983,367 B2 | 1/2006 | Go et al. |
| 6,993,137 B2 | 1/2006 | Franksdonk |
| 7,020,708 B2 | 3/2006 | Nelson et al. |
| 7,113,927 B1 | 9/2006 | Tanaka et al. |
| 7,113,976 B2 | 9/2006 | Watanabe |
| 7,127,604 B2 | 10/2006 | Lide et al. |
| 7,143,181 B2 | 11/2006 | Koka et al. |
| 7,171,552 B1 | 1/2007 | Bell |
| 7,196,807 B2 | 3/2007 | Goldstone |
| 7,228,418 B1 | 6/2007 | Girault |
| 7,254,712 B2 | 8/2007 | Godfrey et al. |
| 7,313,825 B2 | 12/2007 | Redlich et al. |
| 7,392,547 B2 | 6/2008 | Cahill et al. |
| 7,422,131 B2 | 9/2008 | Cohen |
| 7,529,374 B2 | 5/2009 | Huttunen |
| 7,590,700 B2 | 9/2009 | Hirose et al. |
| 7,653,815 B2 | 1/2010 | Godfrey et al. |
| 7,814,161 B2 | 10/2010 | Brown et al. |
| 7,827,406 B2 | 11/2010 | Brown et al. |
| 7,840,207 B2 | 11/2010 | Adams et al. |
| 7,949,355 B2 | 5/2011 | Brown et al. |
| 8,050,653 B2 | 11/2011 | Brown et al. |
| 2001/0046307 A1 | 11/2001 | Wong |
| 2002/0007453 A1 | 1/2002 | Nemovicher |
| 2002/0032861 A1 | 3/2002 | Azuma |
| 2002/0035687 A1 | 3/2002 | Skantze |
| 2002/0059383 A1 | 5/2002 | Katsuda |
| 2002/0065042 A1 | 5/2002 | Picoult et al. |
| 2002/0099727 A1 | 7/2002 | Kadyk et al. |
| 2002/0199119 A1 | 12/2002 | Dunnion et al. |
| 2003/0031320 A1 | 2/2003 | Fan et al. |
| 2003/0090502 A1 | 5/2003 | Yuasa et al. |
| 2003/0115448 A1 | 6/2003 | Bouchard |
| 2003/0142364 A1* | 7/2003 | Goldstone .......... 358/402 |
| 2003/0172122 A1 | 9/2003 | Little et al. |
| 2003/0196098 A1 | 10/2003 | Dickinson et al. |
| 2003/0198350 A1 | 10/2003 | Foster et al. |
| 2003/0236864 A1 | 12/2003 | Lai |
| 2004/0083364 A1 | 4/2004 | Andreaux et al. |
| 2004/0088348 A1* | 5/2004 | Yeager et al. .......... 709/202 |
| 2004/0103160 A1 | 5/2004 | Sheldon et al. |
| 2004/0117456 A1 | 6/2004 | Brooks |
| 2004/0186894 A1 | 9/2004 | Jhingan et al. |
| 2004/0249892 A1 | 12/2004 | Barriga et al. |
| 2005/0015721 A1 | 1/2005 | Tsai |
| 2005/0054334 A1 | 3/2005 | Brown et al. |
| 2005/0114671 A1 | 5/2005 | Little et al. |
| 2005/0163320 A1 | 7/2005 | Brown et al. |
| 2005/0188219 A1 | 8/2005 | Annicet et al. |
| 2005/0210289 A1 | 9/2005 | Brown |
| 2005/0246763 A1 | 11/2005 | Corcoran et al. |
| 2006/0036865 A1 | 2/2006 | Brown et al. |
| 2006/0272006 A1 | 11/2006 | Wei et al. |
| 2007/0118874 A1 | 5/2007 | Adams et al. |
| 2007/0123217 A1 | 5/2007 | Adams et al. |
| 2007/0123307 A1 | 5/2007 | Adams et al. |
| 2007/0165844 A1 | 7/2007 | Little et al. |
| 2008/0098237 A1* | 4/2008 | Dung et al. .......... 713/189 |
| 2009/0080661 A1 | 3/2009 | Brown et al. |

FOREIGN PATENT DOCUMENTS

| | | |
|---|---|---|
| CN | 1674590 A | 9/2005 |
| CN | 101453708 | 11/2011 |
| EP | 0500245 | 8/1992 |
| EP | 0841770 | 5/1998 |
| EP | 1096725 | 5/2001 |
| EP | 1096727 | 5/2001 |
| EP | 1580953 | 9/2005 |
| EP | 1806683 | 7/2007 |
| EP | 2034687 | 3/2009 |
| JP | 7-509333 | 10/1995 |
| JP | 8-251221 | 9/1996 |
| JP | 10-022992 | 1/1998 |
| KR | 1020030059303 | 7/2003 |
| WO | 96/36934 | 11/1996 |
| WO | 97/41661 | 11/1997 |
| WO | 98/34374 | 8/1998 |
| WO | 99/05814 | 2/1999 |
| WO | 99/06900 | 2/1999 |
| WO | 99/27678 | 6/1999 |
| WO | 00/31931 A1 | 6/2000 |
| WO | 00/69114 | 11/2000 |
| WO | 00/72506 | 11/2000 |
| WO | 01/24434 | 4/2001 |
| WO | 01/78491 | 10/2001 |
| WO | 02/01373 | 1/2002 |
| WO | 02/101580 | 12/2002 |
| WO | 03/005636 | 1/2003 |
| WO | 03/058483 | 7/2003 |
| WO | 2004/010661 | 1/2004 |

OTHER PUBLICATIONS

Amendment. Co-pending U.S. Appl. No. 11/291,163. Dated: Feb. 17, 2010.

Request for Continued Examination (RCE). Co-pending U.S. Appl. No. 11/291,163. Dated: Feb. 17, 2010.

Office Action. Co-pending U.S. Appl. No. 11/291,163. Dated: Apr. 16, 2010.

Amendment. Co-pending U.S. Appl. No. 11/291,163. Dated: Sep. 16, 2010.

European Exam Report. Application No. 07115678.0. Dated: Feb. 12, 2010.

Co-pending U.S. Appl. No. 11/859,980, "System and Method for Controlling Message Attachment Handling Functions on a Mobile Device", Filed Sep. 24, 2007.

United States Office Action. U.S. Appl. No. 10/805,932 Dated: Jan. 26, 2007.

Responsive Amendment. U.S. Appl. No. 10/805,932, filed Apr. 26, 2007.

United States Office Action. U.S. Appl. No. 10/805,932 Dated: Jul. 13, 2007.

United States Office Action. U.S. Appl. No. 10/805,932 Dated: Sep. 25, 2007.

Crocker, S. et al., "MIME Object Security Services", IETF Standard, Internet Engineering Task Force, IETF, Oct. 1995.

Stallings, William, "S/MIME: E-mail Gets Secure", BYTE, McGraw-Hill Inc., St Peterborough, U.S., vol. 23, No. 7, Jul. 1998.

European Search and Examination Report. Application No. 07115678.0. Dated: Jan. 29, 2008.

Co-pending U.S. Appl. No. 11/291,163, "Display of Secure Messages on a Mobile Communication Device", Filed Nov. 30, 2005.

Co-pending U.S. Appl. No. 11/291,178, "Display of Secure Messages on a Mobile Communication Device", Filed Nov. 30, 2005.

Amendment. U.S. Appl. No. 10/805,932 Dated: Nov. 23, 2007.

Advisory Action. U.S. Appl. No. 10/805,932 Dated: Dec. 20, 2007.

Request for Continued Examination and Amendment. U.S. Appl. No. 10/805,932 Dated: Mar. 25, 2008.

United States Office Action. U.S. Appl. No. 10/805,932 Dated: May 14, 2008.

Co-pending U.S. Appl. No. 10/805,932, "System and Method for Viewing Message Attachments", Filed Mar. 22, 2004.

Responsive Amendment. U.S. Appl. No. 10/805,932. Amendment Filed: Sep. 15, 2008.

United States Office Action dated Nov. 23, 2010, U.S. Appl. No. 11/859,980.
Gmail, "How do I set up filters?", Apr. 5, 2007, http://mail.google.com/support/bin/answer.py?answer=6579.
United States Final Office Action. U.S. Appl. No. 11/291,163. Dated: Dec. 8, 2010.
Response to Amendment under Rule 312 dated Oct. 27, 2010, U.S. Appl. No. 11/291,178.
Chinese Office Action. Chinese Patent Application No. 200810069098.0. Dated: Jan. 26, 2011.
United States Office Action Response with RCE. U.S. Appl. No. 10/805,932. Dated: Feb. 3, 2011.
United States Office Action Response with RCE. U.S. Appl. No. 11/291,163. Dated: Mar. 8, 2011.
United States Office Action Response. U.S. Appl. No. 11/859,980. Dated: Feb. 22, 2011.
Co-pending U.S. Appl. No. 12/946,632, "Display of Secure Messages on a Mobile Communication Device", Filed Nov. 15, 2010.
Katsuro Inaya et al., Imakoso tsukau Windows CE (time to use Windows CE), Monthly ASCII, Oct. 1, 1999, vol. 23, No. 10, pp. 266-285.
Sawano, Hiroyuki, Create a Secure Electronic Mail Environment with S/MIME!, @IT Security & Trust, May 30, 2001, URL: http://www.atmarkit.co.jp/fsecurity/special/04smime/smime01.html.
Blom et al. "Conversational IP Multimedia Security", 4th International Workshop on Mobile and Wireless Communications Network, Sep. 9-11, 2002, pp. 147-151.
Fumy et al. Principles of Key Management, IEEE Journal on Selected Areas in Communications, VDI, 11, No. 5, Jun. 1993, pp. 785-793.
Eskicioglu et al. "A Key Transport Protocol Based on Secret Sharing Applications to Information Security", IEEE Transactions on Consumer Electronics, vol. 48, No. 4, Nov. 2002, pp. 816-824.
Kotzanikolaou et al., "Hybrid Key Establishment for Multiphase Self-Organized Sensor Networks", 6th IEEE International Symposium on a World of Wireless Mobile and Multimedia Networks, Jun. 13-16, 2005, pp. 581-587.
Research in Motion Limited, Blackberry Security White Paper Release 4.0 2005 Internet Address: http://blackberry.comIknowledgecenterpublicIlivelink.exe?func=II&objId=S2S044&objAction=browse&sort=name.
Policht, Marcin, SQL Server 2005 Security—Part 3 Encryption, Database Journal Internet Address: http://www.databasejournal.com/features/mssql/article.php/3483931.
Kiely, Don, SQL Server 2005 Secures Your Data Like Never Before, Sep. 29, 2005. Internet Address: http://www.devx.com/codemag/Article/29351?trk=DXRSS_DB.
Dusse et al.: "S/MIME Version 2 Certificate Handling", Database IETF RFC Online IETF: RFC 2312, Mar. 1998, pp. 1-20 (Chapter 2.1, Chapter 4.1), XP002220385.
Hoffman: "Enhanced Security Services for S/MIME", Database IETF RFC Online IETF; RFC 2634, Jun. 1999, pp. 1-58 (Chapter 3, pp. 24-32), XP002220386.
Schumacher: "AutoPGP FAQ, Version 1", Internet Newsgroup, 'Online! (Apr. 19, 1994), XP002230742.
Levien, R.: "Protecting Internet E-Mail From Prying Eyes", Data Communications, McGraw Hill. New York, US, vol. 25, No. 6 (May 1, 1996), pp. 117-118, 120, 122, XP000587586.
Syverson, "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., USA, pp. 62-72 (May 6, 1996).
Gong, "Multicast Security and its Extension to a Mobile Environment," Wireless Networks 1, J.C. Baltzer AG, Science Publishers, pp. 281-295 (1995).
Lai, "A mobile subscriber proxy preserving writer-to-reader message security," Military Communications Conference, Milcom '96, Conference Proceedings, IEEE McLean, VA, USA Oct. 21-24, 1996, New York, NY, USA, IEEE, pp. 461-467 (Oct. 21, 1996).
Cole, "An Architecture for a Mobile OSI Mail Access System," IEEE Journal on Selected Areas in Communications, IEEE Inc., New York, USA, vol. 7, No. 2, pp. 249-256 (Feb. 1989).
Harris, "Content Privacy and Content Security Working Together," Internet Article, Content Technologies White Paper, pp. 1-10 (Sep. 1999).
Torvinen, "Wireless PKI: Fundamentals," Internet Article, Radicchio White Paper, pp. 1-15 (2000).
Mambo, "Proxy Signatures: Delegation of the Power to Sign Messages," IEICE Transactions on Fundamentals of Electronics, Communications and Computer Sciences, IEICE Tokyo, Japan, vol. E79-A, No. 9, pp. 1338-1353 (Sep. 1, 1996).
Brown et al., "PGP in Constrained Wireless Devices," Proceedings of the 9th Usenix Security Symposium, Denver, CO, USA, pp. 247-261 (Aug. 14-17, 2000).
Brown, Ian. et al., "A Proxy Approach to E-mail Security," Software Practice & Experience, John Wiley & Sons Ltd., Chichester, GB, vol. 29, No. 12, pp. 1049-1060 (Oct. 1999).
Subramanyam, "Security in Mobile Systems," Reliable Distributed Systems, 1998 Proceedings, 17th IEEE Symposium on W. Lafayette, IN, USA, Oct. 20-23, 1998, Los Alamitos, CA, USA, IEEE Comput. Soc., USA, pp. 407-412 (Oct. 20, 1998).
Final Office Action. Co-pending U.S. Appl. No. 10/805,932. Dated: Dec. 23, 2008.
Amendment After Final. Co-pending U.S. Appl. No. 10/805,932. Dated: Feb. 23, 2009.
Advisory Action. Co-pending U.S. Appl. No. 10/805,932. Dated: Mar. 10, 2009.
Request for Continued Examination (RCE). Co-pending U.S. Appl. No. 10/805,932. Dated: Mar. 23, 2009.
Office Action. Co-pending U.S. Appl. No. 10/805,932. Dated: Jun. 10, 2009.
Amendment. Co-pending U.S. Appl. No. 10/805,932. Dated: Sep. 10, 2009.
Final Office Action. Co-pending U.S. Appl. No. 10/805,932. Dated: Nov. 18, 2009.
Amendment After Final. Co-pending U.S. Appl. No. 10/805,932. Dated: Jan. 19, 2010.
Advisory Action. Co-pending U.S. Appl. No. 10/805,932. Dated: Feb. 5, 2010.
Amendment. Co-pending U.S. Appl. No. 10/805,932. Dated: Feb. 17, 2010.
Request for Continued Examination (RCE). Co-pending U.S. Appl. No. 10/805,932. Dated: Feb. 17, 2010.
Interview Summary. Co-pending U.S. Appl. No. 10/805,932. Dated: Feb. 19, 2010.
Office Action. Co-pending U.S. Appl. No. 10/805,932. Dated: Apr. 14, 2010.
Amendment. Co-pending U.S. Appl. No. 10/805,932. Dated: Aug. 16, 2010.
Final Office Action. Co-pending U.S. Appl. No. 10/805,932. Dated: Sep. 9, 2010.
Office Action. Co-pending U.S. Appl. No. 11/291,178. Dated: Apr. 27, 2009.
Amendment. Co-pending U.S. Appl. No. 11/291,178. Dated: Aug. 7, 2009.
Final Office Action. Co-pending U.S. Appl. No. 11/291,178. Dated: Dec. 31, 2009.
Amendment. Co-pending U.S. Appl. No. 11/291,178. Dated: Jun. 30, 2010.
Request for Continued Examination (RCE). Co-pending U.S. Appl. No. 11/291,178. Dated: Jun. 30, 2010.
Notice of Allowance. Co-pending U.S. Appl. No. 11/291,178. Dated: Jul. 14, 2010.
Amendment After Allowance. Co-pending U.S. Appl. No. 11/291,178. Dated: Oct. 14, 2010.
Office Action. Co-pending U.S. Appl. No. 11/291,163. Dated: Apr. 3, 2009.
Amendment. Co-pending U.S. Appl. No. 11/291,163. Dated: Jul. 2, 2009.
Final Office Action. Co-pending U.S. Appl. No. 11/291,163. Dated: Nov. 16, 2009.
Amendment After Final. Co-pending U.S. Appl. No. 11/291,163. Dated: Jan. 19, 2010.
Summons to attend oral proceedings pursuant to Rule 115(1) EPC. European Patent Application No. 07115678.0. Dated: Apr. 27, 2011.

Notification Of Grant. Chinese Patent Application No. 200810069098.0. Dated: Aug. 26, 2011.
Notice of Allowance. U.S. Appl. No. 10/805,932. Dated: Jun. 24, 2011.
Final Office Action. U.S. Appl. No. 11/859,980. Dated: May 13, 2011.
Amendment and Request For Continued Examination (RCE). U.S. Application No. 11/859,980. Dated: Aug. 10, 2011.
Office Action. U.S. Appl. No. 11/859,980. Dated: Aug. 22, 2011.
Amendment. U.S. Appl. No. 11/859,980. Dated: Nov. 16, 2011.
Co-pending U.S. Appl. No. 13/285,548. "Message-Handling Server and Method for Handling Secure Message Attachments for a Mobile Device", filed on Oct. 31, 2011.
EPO Communication. European Patent Application No. 07115678.0. Dated: Nov. 16, 2011.
Result of Consulation. European Patent Application No. 07115678.0. Dated: Dec. 8, 2011.
Brief Communication. European Patent Application No. 07115678.0. Dated: Dec. 12, 2011.
Communication under Rule 71(3) EPC. European Application No. 07115678.0. Dated: Jan. 16, 2012.
Communication pursuant to Article 94(3) EPC. European Application No. 07115678.0. Dated: Feb. 2, 2009.
Request for Continued Examination (RCE). Co-pending U.S. Appl. No. 10/805,932. Dated: Mar. 25, 2008.
Office Action. Co-pending U.S. Appl. No. 12/946,632. Dated: Feb. 27, 2012.
Office Action. Co-pending U.S. Appl. No. 11/291,163. Dated: Mar. 14, 2012.
Office Action. Canadian Application No. 2,639,161. Dated: Mar. 8, 2012.
Response. Co-pending U.S. Appl. No. 12/946,632. Dated: Mar. 19, 2012.
Office Action. Co-pending U.S. Appl. No. 12/946,632. Dated: Apr. 5, 2012.

* cited by examiner

SYSTEM AND METHOD FOR PROCESSING ATTACHMENTS TO MESSAGES SENT TO A MOBILE DEVICE

CROSS-REFERENCE TO RELATED APPLICATIONS

This application is a continuation of, and claims priority to, prior U.S. patent application Ser. No. 11/849,433, filed on Sep. 4, 2007, the entirety of which is hereby incorporated by reference.

TECHNICAL FIELD

Embodiments described herein relate generally to the processing of messages, such as e-mail messages, and more specifically to a system and method for processing messages with attachments that are sent to a mobile device.

BACKGROUND

Many mobile devices are adapted to permit users to view data associated with message attachments, in some form, on their mobile device. Some of these mobile devices are not equipped with native attachment viewers. In those cases, a message attachment is typically processed initially by a remote server. The remote server retrieves and potentially reformats attachment data, which is then transmitted to the mobile device. The data associated with the attachment that is received at the mobile device is in a form suitable for processing by applications residing on the mobile device, and rendered as needed.

For example, messages addressed to a user of a mobile device may arrive at a message server and may then be routed to a message management server. The message management server is typically configured to convert data associated with a message into a wireless device-friendly format before the message data is transmitted to the mobile device. However, in order to conserve bandwidth, the message management server may also be configured to not send message attachments to the mobile device.

Instead, the message management server may analyze the message and provide data to the mobile device that indicates the existence of one or more attachments to the message. Subsequently, the user of the mobile device may request a specific attachment. The request is sent to the message management server or an attachment server that is configured to process the message, retrieve the requested attachment, and send data associated with the attachment (e.g. text, images) to the mobile device, typically in a device-friendly format.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Some embodiments described herein make use of a mobile station. A mobile station generally comprises a two-way communication device with advanced data communication capabilities having the capability to communicate with other devices, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device may communicate with other devices through a network of transceiver stations.

Figure 1:
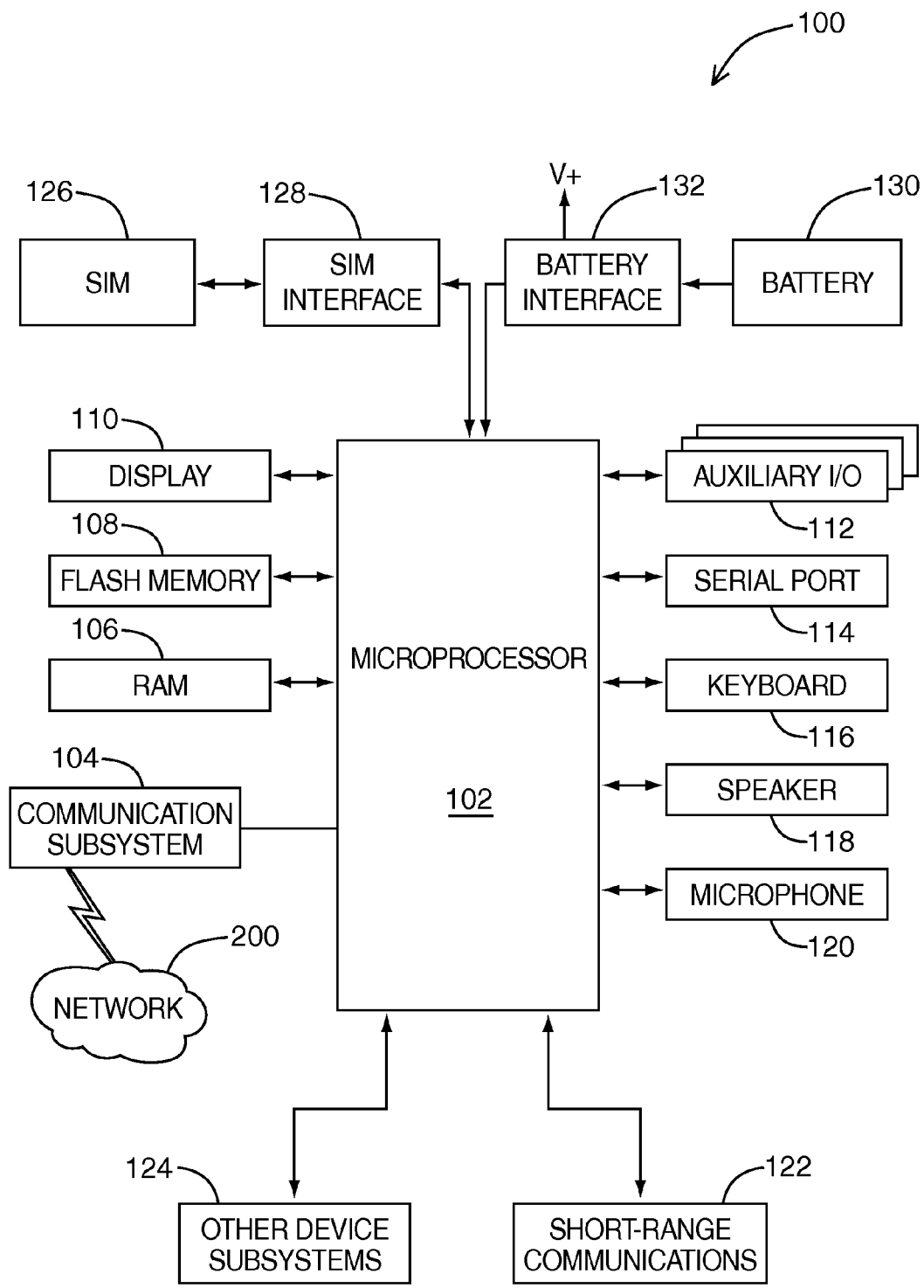
FIG. 1 is a block diagram of a mobile device in one example implementation.
Figure 2:
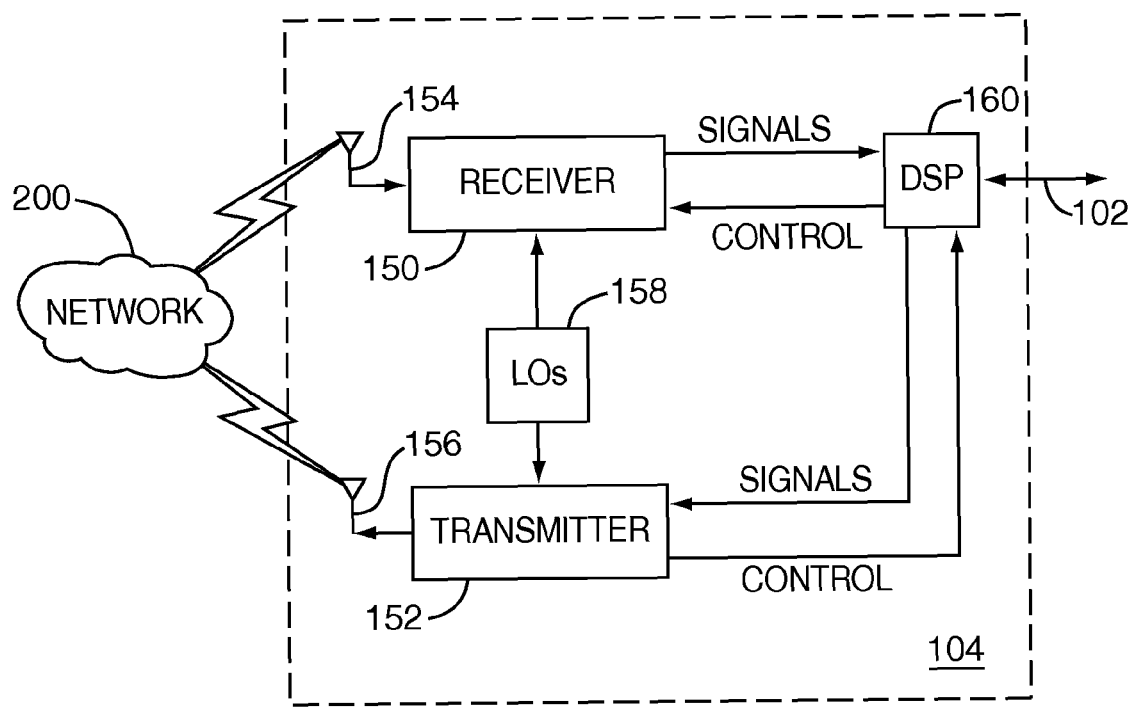
FIG. 2 is a block diagram of a communication subsystem component of the mobile device of FIG. 1.
Figure 3:
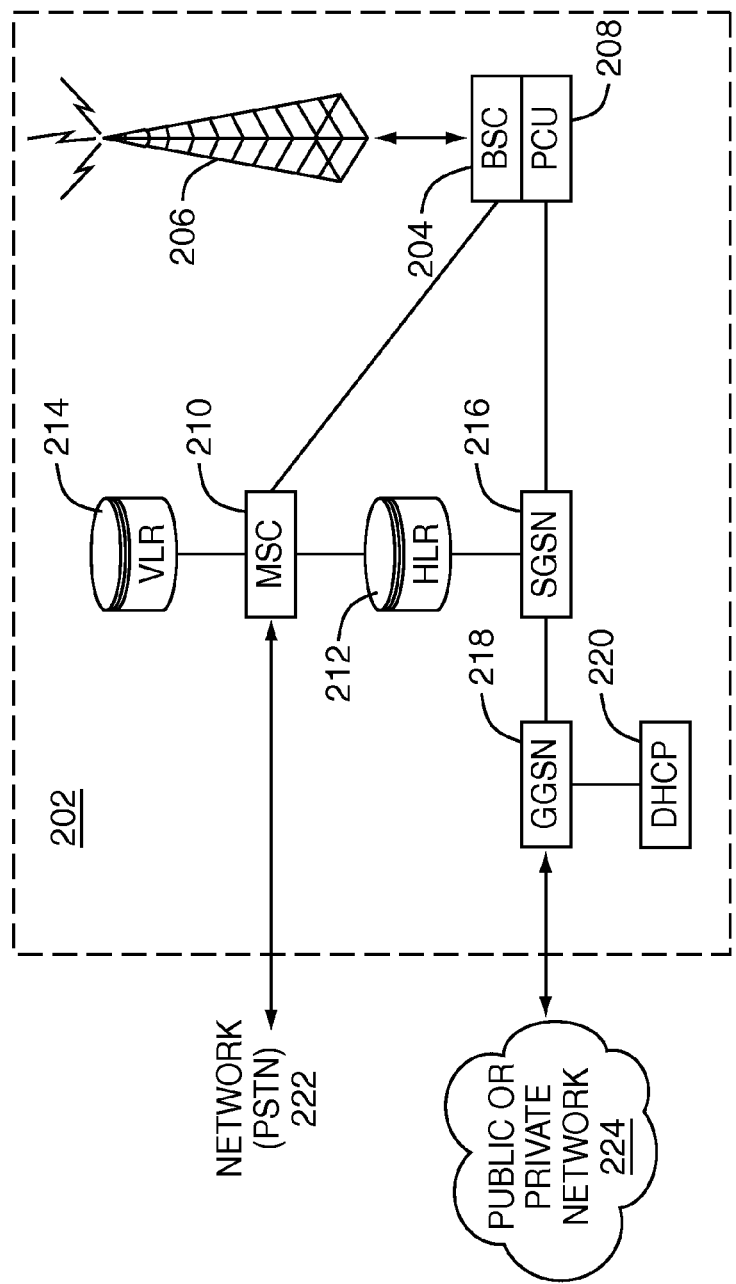
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by newer standards such as Enhanced Data GSM Environment (EDGE), Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Packet Access (HSPA), etc.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services may include without limitation: web browsing and messaging such as e-mail, voice mail, instant messaging, peer-to-peer messaging, Short Message Service (SMS), and Multimedia Messaging Services (MMS). More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, GPRS capable networks use private, dynamically assigned IP addresses, thus requiring a DHCP server 220 connected to the GGSN 218. There are many mechanisms for dynamic IP assignment, including using a combination of a Remote Authentication DialIn User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
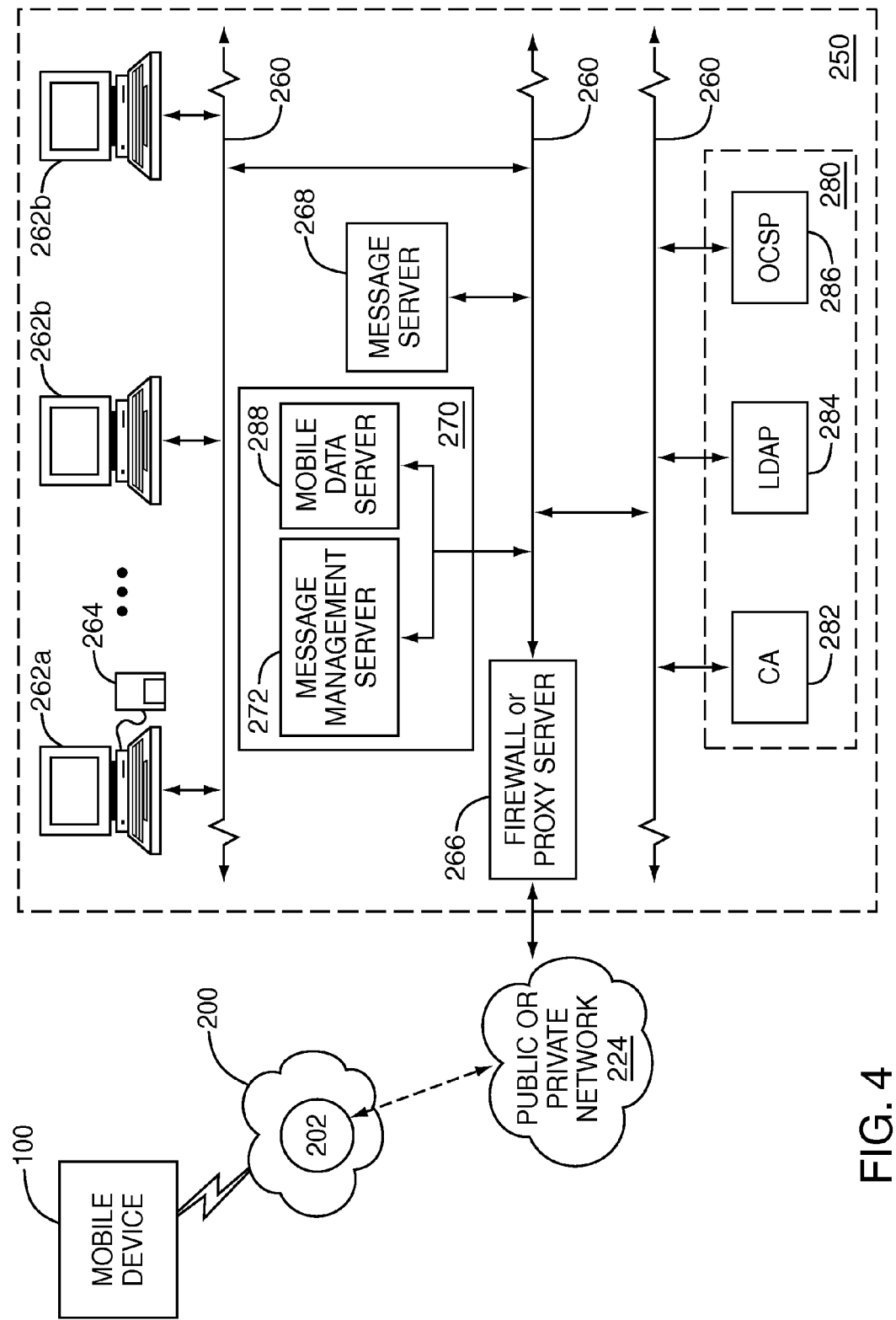
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices is supported.

Embodiments described herein generally related to the processing of encoded messages, such as e-mail messages that are encrypted. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other standards and protocols may be employed to facilitate secure message communication, such as Pretty Good Privacy™ (PGP) and variants of PGP such as Open-PGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information may be shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature generally comprises a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. Where used in this disclosure, "signed and/or encrypted" means signed or encrypted or both. The authenticity of public keys used in these operations may be validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and encrypted messages be sent to those senders, mobile device 100 is adapted to store public keys (e.g. in S/MIME certificates, PGP keys) of other individuals. Keys stored on a user's computer 262a may be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100), in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA (certificate authority or certification authority) server 282 for issuing S/MIME certificates, a Lightweight Directory Access Protocol (LDAP) server 284 used to search for and download certificates and/or PGP keys (e.g. for individuals within the organization), and an Online Certificate Status Protocol (OCSP) server 286 used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates and PGP keys [not shown] may include a Windows® certificate or key store, another secure certificate store on or outside LAN 250, and smart cards, for example.

Embodiments of the system and method described herein are generally applicable to encrypted messages comprising multiple message parts, in which different encryption keys (e.g. session keys) have been used to encrypt the different message parts. Such encrypted messages may be formatted in accordance with a protocol that permits different message parts to be encrypted with different encryption keys, such as a PGP Partitioned encoding format, for example. One example of such a message is shown in FIG. 5.

Figure 5:
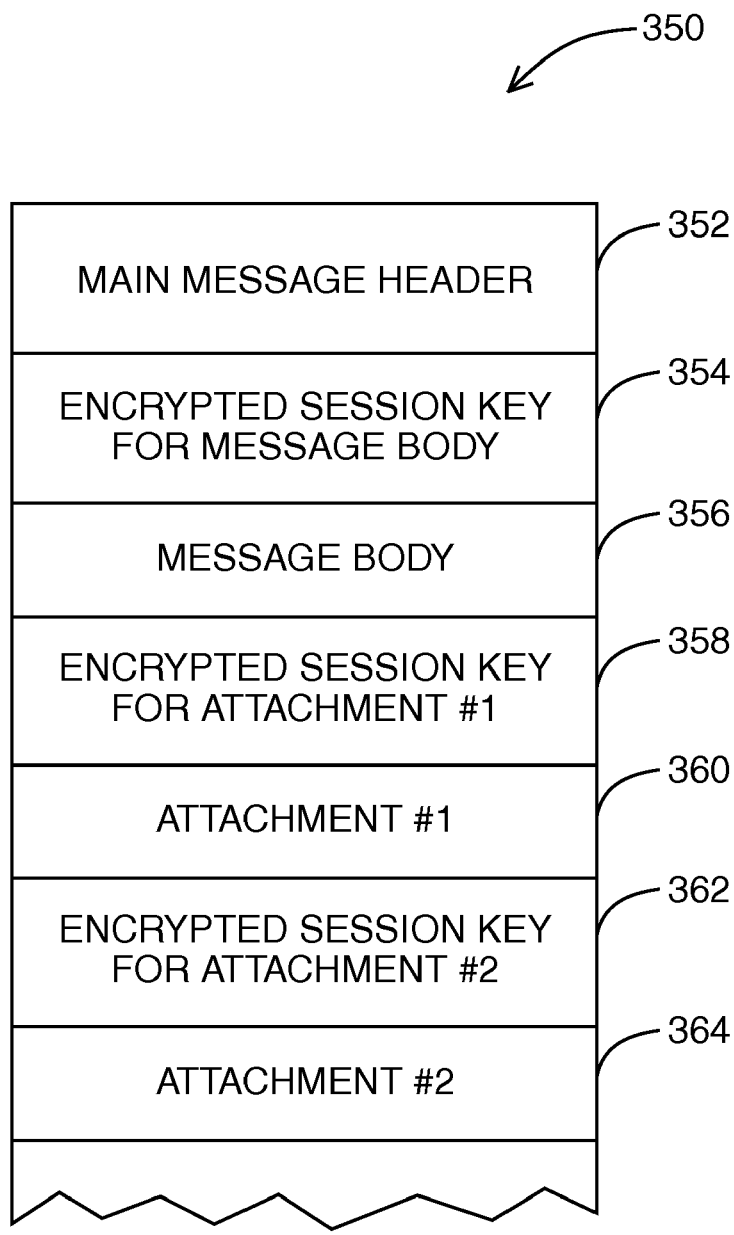
FIG. 5 is a block diagram illustrating components of an example of an encrypted message comprising a plurality of message content parts.

Referring to FIG. 5, a block diagram illustrating components of an example of an encrypted message, as may be received by a message server (e.g. message server 268 of FIG. 4), is shown generally as 350.

In the present example, encrypted message 350 includes various message parts. For example, encrypted message 350 includes a main message header part 352, wherein header portion 352 typically includes addressing information such as "To", "From", and "CC" addresses, and may also include message length indicators, and sender encryption and signature scheme identifiers, for example.

Encoded message 350 may also include a message body part 356 containing message content. Encoded message 350 may also include a first attachment 360 to message 350. Encoded message 350 may also include a second attachment 364 to message 350. Encoded message 350 may also include a footer (not shown).

Encoded message 350 may also include a session key 354 provided within, for example, the data contained in message body part 356, where session key 354 has been used to encrypt data in message body part 356 and has subsequently been encrypted with an encryption key associated with the user (e.g. a public key of a public key/private key pair associated with the user). Session key 354 will typically immediately precede the data of message body part 356 in encoded message 350. However, session key 354 is shown separately from message body part 356 in FIG. 5 to facilitate understanding of this example.

Encoded message 350 may also include a first attachment-specific session key 358 provided within, for example, the data contained in the message part comprising the first attachment 360, where the first attachment-specific session key 358 has been used to encrypt the first attachment 360 and has subsequently been encrypted with the encryption key associated with the user. Attachment-specific session key 358 will typically immediately precede the data of the first attachment 360 in encoded message 350. However, attachment-specific session key 358 is shown separately from the data of the first attachment 360 in FIG. 5 to facilitate understanding of this example.

Encoded message 350 may also include a second attachment-specific session key 362 provided within, for example, the data contained in the message part comprising the second attachment 364, where the second attachment-specific session key 362 has been used to encrypt the second attachment 364 and has subsequently been encrypted with the encryption key associated with the user. Attachment-specific session key 362 will typically immediately precede the data of the second attachment 364 in encoded message 350. However, attachment-specific session key 362 is shown separately from the data of the second attachment 364 in FIG. 5 to facilitate understanding of this example.

Persons skilled in the art will understand that the example message 350 is provided for illustrative purposes only, and that different messages may have a fewer or a greater number of components than shown in FIG. 5. For example, a message may have no attachments. Alternatively, the message may have only one attachment, two attachments as shown, or more than two attachments. For each attachment, an associated session key may or may not be provided for the respective attachment. As a further example, the message body itself may comprise multiple message parts. For each message part of the message body, an associated session key may or may not be provided for the respective message part of the message body. The message may also comprise signature and signature-related information (not shown). It will also be understood by persons skilled in that art that if the message has multiple recipients, there may be multiple encrypted session keys associated with a given message part (e.g. a message body part and/or an attachment), with typically one encrypted session key being provided for each recipient.

Known systems are generally adapted to deal only with messages which provide a single session key per message (e.g. a typical S/MIME message), and not with messages comprising multiple message parts encrypted with different session keys (e.g. PGP Partitioned messages). For example, if an encrypted PGP Partitioned message is received at a mobile device not equipped with an on-device attachment viewer, the user will not be able to view attachments to the message that it might receive at the mobile device using the same methods as it would to view attachments to an encrypted S/MIME message.

Consider the previous example where a message management server analyzes a message for attachments. Suppose that the mobile device is not equipped with an attachment viewer. The message management server does not send any attachments to the message directly. Instead, the message management server provides data to the mobile device that indicates the existence of one or more attachments to the message. The user can then consider this data (i.e. the message's "attachment structure") and subsequently request data associated with a specific attachment that can be rendered on the mobile device.

Where the message comprises multiple attachments that have been encrypted using different encryption keys (e.g. as in a PGP partitioned message), it may be possible for the message management server to determine the general attachment structure for the message even though it cannot decrypt the attachments themselves or view the contents of those attachments.

When data associated with a specific attachment is requested by the user, the attachment will need to be decrypted. To facilitate this, one or more remote servers (e.g. a message management server and/or attachment server) may be provided with a copy of the mobile device user's private key, so that the session key for the specific attachment can be decrypted, and the data associated with the attachment retrieved as required. However, as this would involve control of the private key to be relinquished by the user, the security risks associated with such an implementation would generally be considered undesirable. Moreover, in some circumstances, the private key simply cannot be sent to the server. For example, if the key is stored on a smart card, it cannot be copied from the physical card.

At least some embodiments described herein relate generally to a system and method wherein encrypted session keys for at least one attachment to a message are transmitted from a remote server to a mobile device. The session key for a user requested attachment can be decrypted at the mobile device, and the decrypted session key can be transmitted by the mobile device to a remote server so that the message can be processed in order to retrieve data associated with the user requested attachment. Data associated with the user-requested attachment in a form that can be rendered at the mobile device is then transmitted to the mobile device. These embodiments may be particularly applicable to mobile devices that do not provide for an on-device ("native") attachment viewer capable of processing message attachments in their original form within a received message, although they may be applied for use with other mobile devices as well.

In one broad aspect, there is provided a system and method for processing attachments to messages sent to a mobile device (e.g. mobile device 100 of FIG. 1), the method comprising: after a message addressed to a user of the mobile device is received by one or more remote servers, receiving data associated with the message at the mobile device from the one or more remote servers (e.g. message management server 272 of FIG. 4); wherein the message addressed to the user comprises a plurality of message content parts, at least one of the plurality of message content parts comprising an attachment; wherein each message content part has been encrypted using a different one of a plurality of session keys, and each session key has been encrypted using an encryption key associated with the user; wherein the one or more remote servers (e.g. message management server 274) are configured to initially withhold transmission of data associated with an attachment to the mobile device, and transmit data associated with the attachment to the mobile device only if a request therefor is received; and wherein the data received at said receiving comprises data identifying an attachment structure for the message, and further comprises an encrypted session key for at least one message content part comprising an attachment; and outputting the attachment structure (e.g. to the user of the mobile device).

In another broad aspect, the data received at said receiving comprises the encrypted session key for every message content part comprising an attachment.

In another broad aspect, the method further comprises: receiving an attachment request at the mobile device, the attachment request identifying an attachment to the message; decrypting the encrypted session key at the mobile device for the message content part comprising the attachment identified in the attachment request to determine a decrypted session key; transmitting the decrypted session key with the attachment request from the mobile device to the one or more remote servers (e.g. message management server 272 and/or an attachment server [not explicitly shown in FIG. 4]); wherein the one or more remote servers are configured to retrieve the attachment identified in the attachment request by decrypting the message content part comprising the attachment identified in the attachment request using the decrypted session key, and to transmit data associated with the attachment in decrypted form to the mobile device; and receiving data associated with the attachment identified in the attachment request in decrypted form at the mobile device.

In another broad aspect, the message addressed to the user comprises a main message header, wherein the data identifying an attachment structure for the message and the encrypted session key for each message content part comprising an attachment have been stored in the main message header; and wherein the data associated with the message received at the mobile device comprises data stored in the main message header. In one example embodiment, the one or more remote servers (e.g. message management server 272) are configured to retrieve, for the message addressed to a user of the mobile device received by the one or more remote servers, an encrypted session key for each message content part comprising an attachment, and to store each encrypted session key in the main message header. In another example embodiment, the encrypted session key for each message content part comprising an attachment has been stored in the main message header at a sender's computing device from which the message originates.

In another broad aspect, the message addressed to the user comprises a main message header and at least one message part associated with each message content part comprising an attachment, wherein an encrypted session key for each message content part comprising an attachment has been stored in the associated one of the at least one message part, and wherein at least one encrypted session key is received at the mobile device.

In another broad aspect, the message is more specifically a message formatted in accordance with a format in which each encrypted attachment has a different session key, such as, for example, a PGP Partitioned encoding format.

These and other aspects and features of various embodiments will be described in greater detail below.

Figure 6:
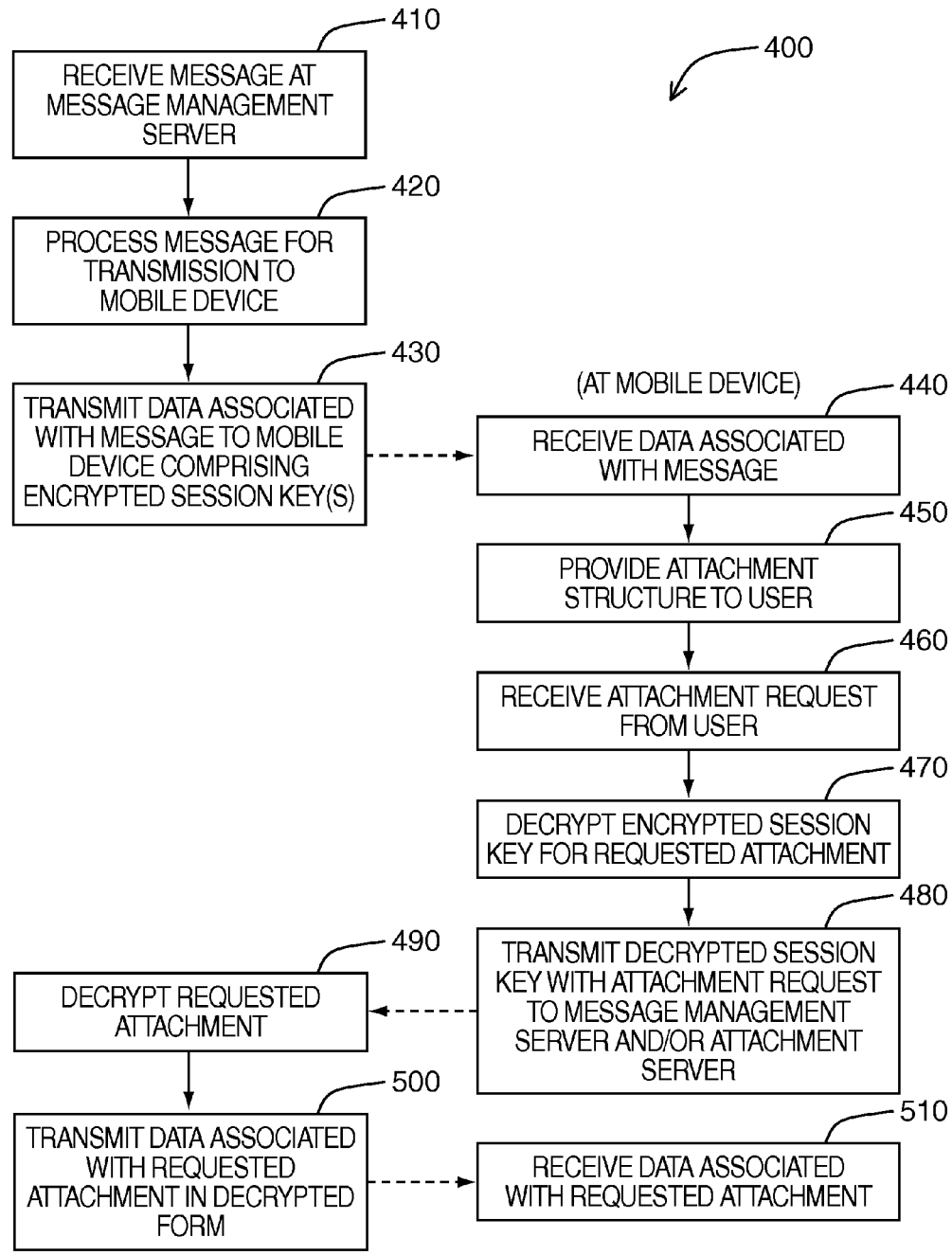
FIG. 6 is a flowchart illustrating steps in a method of processing attachments to a message sent to a mobile device in accordance with at least one embodiment.

Referring now to FIG. 6, a flowchart illustrating steps in a method of processing attachments to a message sent to a mobile device in accordance with at least one embodiment is shown generally as 400. Additional details of some of the features described below in respect of the steps of method 400 have been described earlier in the present description.

To facilitate better understanding of the flow of method steps of method 400, certain steps may be performed remotely from a mobile device and other steps may be performed at the mobile device (e.g. mobile device 100 of FIG. 1). In one embodiment, at least some of these steps performed at the mobile device are performed by a messaging application that executes and resides on the mobile device. The messaging application need not be a stand-alone application, and the functionality of the messaging application may be implemented in one or more applications executing and residing on the mobile device.

At step 410, a message addressed to a user of the mobile device is received by one or more remote servers. In one example embodiment, the one or more remote servers comprise a message management server (e.g. message management server 272 of FIG. 4). The message is of the type that comprises multiple message content parts, wherein each message content part has been encrypted (e.g. at a sender's computing device from which the message originates) with a different one of a plurality of session keys, and wherein each session key was then subsequently encrypted with an encryption key associated with the recipient (i.e. with the user of mobile device 100 in this example).

The encryption key associated with the user that is used to encrypt the session keys is typically a public key associated with the user. However, in variant embodiments, a symmetric key may be employed.

By way of example, the message received at step 410 may be similar to message 350 as described with reference to FIG. 5. For example, the message may be a PGP Partitioned message.

At step 420, the message management server processes the message to prepare the message for transmission to the mobile device, and data associated with the message as a result of the processing is then transmitted to the mobile device at step 430. By way of example, data associated with the message as transmitted to the mobile device may be provided as one or more data blocks.

As previously noted, in various embodiments described herein, attachments (in their original form in the received message) are not sent to the mobile device at step 430. The message management server is configured to initially withhold transmission of attachments to the mobile device. Data associated with an attachment (e.g. in a form that does not require the mobile device to be equipped with a native attachment viewer) is transmitted to the mobile device if a request for the data by way of an attachment request is received from the user.

However, where the message comprises multiple separately encrypted message parts, it may be possible to determine a general attachment structure for the message. Data identifying the attachments (e.g. a file name) as may be provided in a message part headers associated with the attachments may be used to facilitate a determination of the attachment structure that may be made when processing the message at step 420.

The data transmitted to the mobile device at step 430 comprises data identifying the attachment structure. The data transmitted at step 430 further comprises an encrypted session key for each message content part that comprises an attachment. Typically, the data transmitted at step 430 will also comprise data associated with a main message header, an encrypted message body and the associated encrypted session key.

In some instances, not all of the encrypted session keys for every message content part that comprises an attachment may have been transmitted to the mobile device at step 430, due to data transmission limits for example. In that event, if an attachment is later requested by the user for which the associated encrypted session key has not yet been transmitted to the mobile device, the associated encrypted session key may be required to first be transmitted to the mobile device for decryption (step not shown).

In one example embodiment, in processing the message at step 420, the message management server retrieves the encrypted session key for each message content part comprising an attachment, and optionally, the encrypted session key associated with the message body. All of the retrieved keys are stored in a main message header, which is transmitted to the mobile device at step 430. Accordingly, all of the encrypted session keys for the message content parts that comprise an attachment may then be typically received at the mobile device, even if the mobile device receives only a small part of the entire message, as data in the main message header is typically provided before other message data when message data is transmitted from the message management server to the mobile device.

In another example embodiment, the message management server need not process the message to retrieve the encrypted session keys for storage in the main message header when the encrypted session keys for each message content part comprising an attachment have already been pre-stored in the main message header. The encrypted session keys may have been pre-stored in the main message header at a sender's computing device from which the message received at step 410 originates.

In another example embodiment, the encrypted session keys for each message content part comprising an attachment may be placed within associated individual message parts, each individual message part immediately preceding or contained within the respective message content part, when data for the message is transmitted to the mobile device at step 430. In this manner, the encrypted session keys are transmitted in an order reflecting their original positions within the message, as received by the mobile device.

At step 440, the data that is transmitted by the message management server at step 430 is received at the mobile device.

At step 450, the attachment structure for the message is provided as output to the user based on the data received at step 440. The user may be informed of the attachment structure through the use of a messaging application.

In use, if after considering the attachment structure, the user wishes to request a specific attachment for the message, steps 460 to 510 are performed.

At step 460, an attachment request that identifies one or more requested attachments is received from the user.

At step 470, the encrypted session key associated with each requested attachment as identified in the attachment request is decrypted. A private key associated with the user, which typically resides on the mobile device, may be used for this purpose, where the encrypted session keys of the message have been encrypted (e.g. at the sender's computing device) using the corresponding public key associated with the user.

In a variant embodiment, the encrypted session key may be decrypted with a symmetric key at step 470, where the encrypted session keys of the message have been encrypted (e.g. at the sender's computing device) using a symmetric key.

At step 480, each session key decrypted at step 470 is transmitted with the attachment request to one or more remote servers. For example, the attachment request may be transmitted to an attachment server, either directly or via another remote server such as the message management server. In variant embodiments, the functions of the attachment server may be provided by the message management server.

At step 490, the attachment request is received by the one or more remote servers, and the requested attachment(s) are decrypted using the decrypted session key(s) received from the mobile device.

At step 500, decrypted data associated with the requested attachment(s) is transmitted to the mobile device, and subsequently received at the mobile device at step 510. The data transmitted by the one or more remote servers and received at the mobile device is typically device-friendly, and may be provided as text and images that can be processed by a messaging application residing and executing on the mobile device for rendering to a user.

In one example embodiment, the message management server may decrypt the requested attachment(s) at step 490, and then forward the decrypted attachment(s) to an attachment server for further processing, in order to generate data associated with the attachment(s) in a format suitable for rendering on the mobile device (e.g. a mobile device not equipped with a native attachment viewer).

In variant embodiments, the decryption of attachments and the subsequent processing thereof may be performed by the same server.

In the case where a message is addressed to a plurality of recipients, there may be a plurality of encrypted session keys associated with each message content part. For example, there may be one encrypted session key per recipient for each message content part. In such a case, the message management server may transmit all encrypted session keys for each part to the mobile device, and allow the mobile device to determine which of the encrypted session keys it is capable of decrypting. Alternatively, if the message management server has knowledge of which private keys are stored on the mobile device, it may choose to send only one or more of the encrypted session keys that were encrypted with public keys corresponding to the private keys stored on the mobile device.

Persons skilled in the art will understand that certain steps of method 400 may be repeated. For example, method 400 may be repeated when another message intended for a user of the mobile device is to be processed. As a further example, steps 460 to 510 may be repeated when the user submits a further attachment request in respect of the same message for which an attachment request was previously made.

The steps of a method of processing attachments in accordance with any of the embodiments described herein may be provided as executable software instructions stored on computer-readable media, which may include transmission-type media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure has been described with regard to a number of embodiments. However, it will be understood by persons skilled in the art that other variants and modifications may be made without departing from the scope of the invention as defined in the claims appended hereto.

The invention claimed is:

1. A mobile device configured to process a message comprising a plurality of encrypted attachments received from a sender via one or more remote servers, wherein the mobile device comprises a processor and memory, and wherein the processor is configured to perform acts comprising:
   receiving, from the one or more remote servers, data associated with the message, wherein the one or more remote servers are configured to initially withhold transmission of each encrypted attachment of the plurality of encrypted attachments to the mobile device until a request for the attachment is made by the mobile device, and wherein the data received from the one or more remote servers identifies an attachment structure for the message and comprises at least one encrypted session key of a plurality of session keys; and
   outputting the attachment structure;
   wherein the message as sent from the sender comprises the plurality of encrypted attachments, wherein each of the plurality of encrypted attachments is encrypted using a different one of the plurality of session keys, and wherein each session key of the plurality of session keys is encrypted such that the session key is decryptable with a key accessible to the mobile device but not to the one or more remote servers.

2. The device of claim 1, wherein the data associated with the message received at the mobile device comprises an encrypted session key for each of the plurality of encrypted attachments.

3. The device of claim 2, wherein the processor is further configured to:
   receive an attachment request via a user interface of the mobile device, the attachment request identifying a specific encrypted attachment of the plurality of encrypted attachments;

decrypt the encrypted session key for the specific encrypted attachment to produce a decrypted session key;

transmit the decrypted session key with the attachment request to the one or more remote servers, wherein the one or more remote servers are configured to decrypt the specific encrypted attachment using the decrypted session key and to transmit data associated with the specific encrypted attachment in decrypted form to the mobile device; and receive data associated with the specific encrypted attachment in decrypted form from the one or more remote servers.

4. The device of claim 3, wherein the device is not equipped with a native attachment viewer.

5. The device of claim 3, wherein the data associated with the specific encrypted attachment received in decrypted form from the one or more remote servers comprises text and images, which are processed by a messaging application residing and executing on the mobile device for rendering in the user interface.

6. The device of claim 2, wherein the at least one encrypted session key received from the one or more remote servers is provided in a message header.

7. The device of claim 6, wherein the one or more remote servers are configured to retrieve the encrypted session key for each of the plurality of encrypted attachments, and to store the encrypted session key for each of the plurality of encrypted attachments in the message header.

8. The device of claim 6, wherein the encrypted session key for each of the plurality of encrypted attachments has been stored in the message header at a computing device of the sender.

9. The device of claim 2, wherein the encrypted session key for each of the plurality of encrypted attachments is provided with its corresponding encrypted attachment in an associated message part, within the data received from the one or more remote servers.

10. The device of claim 1, wherein the one or more remote servers comprises a message management server.

11. The device of claim 1, where the one or more remote servers comprises an attachment server.

12. The device of claim 1, wherein the message comprises a message formatted in accordance with a PGP Partitioned encoding format.

13. The device of claim 1, wherein the message comprises an e-mail message.

14. The device of claim 1, wherein the message comprises an instant message.

15. The device of claim 1, wherein the message comprises a peer-to-peer message.

16. The device of claim 1, wherein each of the plurality of encrypted attachments is formatted in accordance with a PGP Partitioned encoding format.

17. The device of claim 1, wherein the device is not equipped with an attachment viewer.

18. The device of claim 1, wherein the key accessible to the mobile device is stored on a smart card.

19. The device of claim 1, wherein the key accessible to the mobile device comprises a public key of a public key and private key pair.

20. The device of claim 1, wherein the key accessible to the mobile device comprises a symmetric encryption key.

* * * * *